(12) United States Patent
Antoun

(10) Patent No.: US 6,776,419 B2
(45) Date of Patent: Aug. 17, 2004

(54) SEAL FOR A RECIPROCATING PLUNGER

(76) Inventor: Gregory S. Antoun, P.O. Box 1057, Meadville, PA (US) 16335

( * ) Notice: Subject to any disclaimer, the term of this patent is extended or adjusted under 35 U.S.C. 154(b) by 0 days.

(21) Appl. No.: 10/161,625

(22) Filed: Jun. 5, 2002

(65) Prior Publication Data

US 2003/0227139 A1 Dec. 11, 2003

(51) Int. Cl.[7] .............................................. F16J 15/02
(52) U.S. Cl. ........................ 277/500; 277/578; 277/582
(58) Field of Search ........................ 277/434, 436–438, 277/447, 448, 500, 502, 505–509, 510, 511, 522, 529, 531–534, 540, 578, 581, 582

(56) References Cited

U.S. PATENT DOCUMENTS

| | | | |
|---|---|---|---|
| 1,412,251 A | | 4/1922 | Marshall |
| 1,698,546 A | | 1/1929 | Hoffman |
| 1,838,669 A | | 12/1931 | Goodyear |
| 1,860,025 A | | 5/1932 | Good |
| 1,877,413 A | | 9/1932 | Marshall |
| 2,080,579 A | | 5/1937 | Schaub |
| 2,081,040 A | | 5/1937 | King |
| 2,376,147 A | | 5/1945 | Johnston |
| 2,631,907 A | | 3/1953 | Johnson |
| 2,833,572 A | | 5/1958 | Moseley |
| 2,873,127 A | * | 2/1959 | Pratt et al. .................. 277/390 |
| 3,002,776 A | | 10/1961 | Tschappat |
| 3,181,874 A | | 5/1965 | Conklin |
| 3,244,425 A | | 4/1966 | Wilkinson |
| 3,550,988 A | | 12/1970 | Schenck, Jr. et al. |
| 3,554,280 A | | 1/1971 | Tucker |
| 3,865,387 A | * | 2/1975 | Larker et al. ................ 277/500 |
| 4,327,923 A | * | 5/1982 | Chesterton et al. ......... 277/531 |
| 4,560,176 A | | 12/1985 | Hoff |
| 4,570,944 A | | 2/1986 | Traub |
| 4,893,781 A | * | 1/1990 | Kalain et al. ................ 251/214 |
| 4,936,197 A | * | 6/1990 | Brent .......................... 92/168 |
| 4,978,102 A | * | 12/1990 | Schuchart et al. .......... 251/324 |
| 5,209,501 A | * | 5/1993 | Smith ......................... 277/522 |
| 5,292,137 A | | 3/1994 | Simmons et al. |
| 2003/0116199 A1 | * | 6/2003 | Schroeder et al. .......... 137/541 |

FOREIGN PATENT DOCUMENTS

| | | |
|---|---|---|
| EP | 76169 | 6/1983 |
| JP | 2-298653 | 12/1990 |
| WO | 91/10826 | 7/1991 |

* cited by examiner

Primary Examiner—Alison K. Pickard
Assistant Examiner—Vismal Patel
(74) Attorney, Agent, or Firm—Richard C. Litman

(57) ABSTRACT

A seal for a reciprocating plunger is formed of a hard polyimide plastic, rather than the relatively soft elastomers of earlier seals. The present seal has a conical section, with the tapered face fitting closely within the mating conical face of a hard metal retainer. An O-ring resides in a groove within the seal to provide low pressure sealing between the plastic seal and the metal retainer. The tapers of the seal and retainer urge the seal inwardly toward the plunger by operational pressures, thereby providing a better seal. The present seal provides greatly extended life over softer prior art seals, and will generally last for the life of the pump or other mechanism in which it is installed. Yet, the plastic material allows some flow under high pressures, allowing the seal to conform closely to the plunger surface during operation and throughout the life of the seal.

17 Claims, 2 Drawing Sheets

SEAL FOR A RECIPROCATING PLUNGER

BACKGROUND OF THE INVENTION

1. Field of the Invention

The present invention relates generally to sealing means for pumps and the like, and more specifically to a high pressure seal for use in reciprocating pumps and the like. The present seal has an external conical shape which conforms to a mating internal conically shaped seal retainer, with the assembly installed about the piston or plunger of a high pressure pump. The present seal is formed of a hard polyimide plastic material (e.g., Vespel®), which provides considerably greater durability than conventional softer seal material and also stabilizes the piston or plunger to increase efficiency and reduce wear.

2. Description of the Related Art

Reciprocating pumps are commonly used to provide high pressure liquid flow in various devices, such as car washes, pressure washers, etc. The plungers generally have a relatively small diameter and are adapted to provide quite high pressure. Yet, conventional practice has been to use seals formed of relatively soft materials in such pumps, in order for the seal material to "flow" and conform as liquid pressure distorts the seal and forces it against the stationary and moving surfaces of the pump.

Such conventional seals may be in the form of O-rings, cup seals, etc., but their common characteristic is their relative pliability and lack of resistance to wear and to internal forces within the pump assembly. This results in relatively short seal life, and also allows some limited lateral movement of the piston or plunger within its bore. The other than reciprocating motion results in lower efficiency and increased wear and vibration of the pump assembly in comparison to the ideal. Moreover, the relatively soft seals require replacement at relatively frequent intervals, with seal replacement obviously resulting in some down time for the pump and corresponding lost revenue for the operator.

The present invention provides a solution to the above problem of relatively soft seals in high pressure reciprocating pumps, by providing a seal formed of a hard plastic compound, e.g., Vespel® Vespel is a trademark of the DuPont Company); other suitable materials may be used. The present seal has a conical external face mating closely with an internal conical surface formed in a high pressure seal retainer which surrounds the plunger. A conventional O-ring is provided between the two conical faces to seal the two mating and relatively stationary seal surfaces. As the hard plastic seal wears against the plunger, the system operating pressure forces it downwardly into the mating internal conical retainer. While the material used is quite hard, it nonetheless has sufficient "flow" to be forced inwardly by the conical shape of the seal retainer, to fit closely about the plunger and provide a good seal about the sides of the plunger for the duration of the lifetime of the pump assembly.

A discussion of the related art of which the present inventor is aware, and its differences and distinctions from the present invention, is provided below.

U.S. Pat. No. 1,412,251 issued on Apr. 11, 1922 to Lewis C. Marshall, titled "Piston Packing," describes mating conically faced piston rings for use in an internal combustion engine. Such rings are conventionally formed of cast iron and are relatively inflexible, in comparison to the hard plastic material of which the present seal is formed. As a result, Marshall requires that the rings have a split across their thicknesses, i.e., that they be circumferentially discontinuous, unlike the present seal. Moreover, the construction of the Marshall rings is essentially opposite that of the present seal, as Marshall grooves the piston to provide a seat for his rings. In contrast, the present seal is relatively stationary, and is secured by a retainer which is in turn secured immovably within the pump housing.

U.S. Pat. No. 1,698,546 issued on Jan. 8, 1929 to Loran L. Hoffman, titled "Piston Ring," describes a ring constructions wherein the rings have mating conical faces. The Hoffman ring construction more closely resembles the ring construction of the Marshall '251 U.S. patent discussed immediately above, than it does the present invention, due to the rings being installed within grooves in the moving piston, rather than being retained immovably in the housing or cylinder. Moreover, the Hoffman rings are each formed of a series of segments, rather than comprising a single, unbroken toroidal shape, as in the present seal invention.

U.S. Pat. No. 1,838,669 issued on Dec. 29, 1931 to Edward J. Goodyear, titled "Piston Ring," describes a piston ring set in which the rings have mating internal and external conical faces, much like the ring set of the Marshall '251 U.S. patent discussed further above. However, the bevel angle of the conical faces of the Goodyear rings extends inwardly in the direction away from the crown of the piston, rather than outwardly away from the crown, as in the case of Marshall. Otherwise, the same points of difference noted in the discussion of the Marshall '251 U.S. patent, are noted here as well, i.e., the relatively brittle nature of the cast iron used in conventional piston rings and the need to provide splits across the thicknesses of the rings, and the fact that the rings move relative to the cylinder bore rather than comprising a seal affixed within the bore or housing, as in the present invention.

U.S. Pat. No. 1,860,025 issued on May 24, 1932 to Francis R. Good, titled "Piston Ring," describes a ring set for use in internal combustion engines as well as other motors, pumps, etc. No specific material is described, but the application of the Good ring set to internal combustion engines indicates that conventional cast iron is used. In fact, Good provides split ring construction, with a specially configured joint in the mating ends of each ring. Good also provides a mating conical face for the top ring, with the conical surface facing inwardly and away from the piston crown. However, the mating face has a spherical shape, contacting the upper ring only along a relatively narrow circumferential line.

U.S. Pat. No. 1,877,413 issued on Sep. 13, 1932 to Lewis C. Marshall, titled "Piston Packing For Internal Combustion Engines," describes a series of ring embodiments, some of which include at least one tapered (i.e., conical) face. Each of the rings of the Marshall '413 U.S. patent is discontinuous and includes a split across its width or thickness, in order to allow for spread during installation about the larger diameter portion of the piston before seating in the ring groove. In contrast, the present seal forms a continuous toroidal ring, as it does not have to be distended to fit about the wider portion of a piston to seat within a ring groove, as in the case of the Marshall and other rings discussed to this point.

U.S. Pat. No. 2,080,579 issued on May 18, 1937 to Thomas Schaub, titled "Piston Ring," describes a ring construction which closely resembles that disclosed in the Hoffman '546 U.S. patent discussed further above. Schaub discloses different embodiments of split type piston rings, with the difference between embodiments being that in one case the conical taper is oriented inwardly and upwardly toward the crown of the piston, and in the other case the taper is oriented inwardly and away from the piston crown. Schaub is silent regarding the material of which is rings are made, so it must be assumed that they are formed of a conventional and relatively brittle cast iron material, which cannot flow to fit the cylinder bore to accommodate wear. In contrast, the present seal is unbroken and is formed of a hard plastic which can flow to a certain extent to accommodate wear.

U.S. Pat. No. 2,081,040 issued on May 18, 1937 to Walter E. King, titled "Packing," describes a series of embodiments of seals, each having a concave pressure face with bifurcated lips which are distended due to pressure to bear against the walls of the piston and cylinder. This type of seal is commonly known as a "cup" seal, due to its cross sectional shape, and must be formed of a relatively soft and pliable material. While the pump assembly in which the present invention is used also utilizes a cup seal, King teaches away from any provision of a high pressure seal formed of a relatively hard material. The present invention comprises a seal formed of such hard material, and which is capable of withstanding considerably greater pressures than any of the King seal embodiments.

U.S. Pat. No. 2,376,147 issued on May 15, 1945 to Harry B. Johnson, titled "Piston And Piston Ring," describes different embodiments of piston ring sets having mating conical faces. In each case, the rings are split, as they must be spread to fit about the wider diameter of the piston to seat within the ring groove of the piston. This will always be the case where conventional piston rings made of relatively brittle material (i.e., cast iron) are used. In contrast, the present seal is not a piston ring per se, but rather installs in a mating retainer which is in turn secured within the cylinder or housing wall of the assembly. The piston or plunger of the pump with which the present seal is used, does not include any grooves or provision for ring installation.

U.S. Pat. No. 2,631,907 issued on Mar. 17, 1953 to Carl G. A. Johnson, Jr., titled "Valve," describes a series of embodiments of sealing or packing rings for a reciprocating piston type valve mechanism. In one embodiment, a piston ring set closely resembling that disclosed in the Schaub '579 U.S. patent, discussed further above, is disclosed. The Johnson, Jr. ring set includes a non-metal ring of "resilient or elastic material" (column 2, line 39) which bears against a metal ring, both of which are seated within a circumferential groove in the piston. The metal ring is split, as is required for installation in a piston ring groove. In contrast, the present seal comprises an unbroken toroidal configuration, as it does not have to be spread to fit within a piston ring groove.

U.S. Pat. No. 2,833,572 issued on May 6, 1958 to Charles F. Moseley, titled "Double Packed Oil Well Stuffing Box," describes such a stuffing box for a reciprocating polished rod in which two spaced apart sets of packing rings are installed. The Moseley packing rings are relatively stationary, as they secure within the stuffing box with the polished rod being devoid of ring grooves and sliding within the packing rings. However, the Moseley packing rings differ from the present seal, in that (1) they have no flat annular face which bears against a retaining ring; (2) they are formed of a relatively soft, resilient material; and (3) they are split, rather than being closed toroidal forms, as evidenced by the statement that they may be replaced without ceasing operation of the well pump (column 4, lines 1–3).

U.S. Pat. No. 2,873,127 issued on Feb. 10, 1959 to Ward E. Pratt et al., titled "Mechanical Seal," describes a relatively hard, brittle seal insert (column1, lines 36–38, etc.) for use in a device having a rotary (not reciprocating) shaft. Various seals are provided, with the seals having conical tapers of various angles. One seal set closely resembles that of the Schaub '579 U.S. patent, discussed further above, but are relatively stationary and installed about a shaft having a smooth, ungrooved surface. Pratt et al. note that the packing rings or seal set of interest are "Deformable" (column 3, line 16), whereas the seals of the present invention are formed of a relatively hard material which can flow only under conditions of relatively high pressure and extended periods of time, as is consistent with the wear patterns of the material involved.

U.S. Pat. No. 3,002,776 issued on Oct. 3, 1961 to Sheridan P. Tschappat, titled "Molded Packing Gland," describes two embodiments of a seal comprising a generally conical shape. The Tschappat seals are formed of relatively soft and pliable material, unlike the very hard plastic material from which the present seal is formed. Moreover, Tschappat adapts his seals for installation about a continuous elongate shaft, precluding any requirement for disassembly of the mechanism. Accordingly, Tschappat must provide a slit in one side of each of his seals, in order for them to pass over the shaft from the side. The present seal comprises a circumferentially continuous component, devoid of any breaks, slots, or the like therein.

U.S. Pat. No. 3,181,874 issued on May 4, 1965 to Elmer W. Conklin, titled "Outside Mounted Balanced Seal," describes a seal formed of relatively soft material (i.e., polytetrafluoroethylene) and having a conical surface which bears against a plastic seal retainer. The mating conical surfaces of the seal retainer and seal, result in a pressure which urges the seal against the surface of the shaft. However, no additional sealing means (O-rings, etc.) are provided by Conklin between the seal and seal retainer. In contrast, the present invention provides a seal formed of a much harder plastic material which interfaces with a metal seal retainer with an O-ring between the two to provide a low pressure seal for any fluid which might escape past the high pressure seal provided between the piston or plunger and the seal face. It is also noted that the Conklin seal is directed for use with a rotary shaft, rather than with a reciprocating plunger.

U.S. Pat. No. 3,244,425 issued on Apr. 5, 1966 to Samuel C. W. Wilkinson, titled "Axially Biased Rotary Face Seal," describes a seal assembly which closely resembles that of the Conklin '874 U.S. patent, described immediately above. One embodiment of the Wilkinson seal comprises a pair of seal holders having conically tapered faces, with a relatively thin, conically tapered seal installed therebetween. However, this seal does not bear directly upon the moving shaft, but remains stationary between the two relatively fixed seal retainers, unlike the present invention. Moreover, the shaft of the device with which the Wilkinson assembly is used, is rotary, rather than reciprocating.

U.S. Pat. No. 3,550,988 issued on Dec. 29, 1970 to Robert C. Schenk, Jr. et al., titled "Piston And PTFE Ring Assembly For Engines," describes a ring assembly comprising a slotted metal expander ring which resides behind a circumferentially continuous compression ring formed of filled polytetrafluoroethylene material. The two rings have mating conical faces, with the slope of the conical faces serving to urge the compression ring outwardly against the face of the cylinder, depending upon the direction of the conical slope, direction of movement of the piston within the cylinder, and expansion forces developed by gases within the cylinder. This construction is more closely related to the piston ring assembly of the Schaub '579 U.S. patent and others discussed further above, than to the present invention, as it installs within a ring in the piston, rather than within the wall of the assembly.

U.S. Pat. No. 3,554,280 issued on Jan. 12, 1971 to Andrew J. Tucker, titled "Well Packer And Sealing Elements Therefor," describes a seal assembly in which a resilient central element is captured between a pair of axially compressive fittings. The fittings include conically tapered resilient members which bear against mating conical tapers of the central element. However, the material is not sufficiently hard or durable to provide long life, and no harder metal retainer is provided. This precludes any need for a supplementary low pressure seal between the hard plastic high pressure seal element and its retainer, as provided in the present seal assembly invention.

U.S. Pat. No. 4,327,923 issued on May 4, 1982 to Arthur W. Chesterton et al., titled "Packing," describes an assembly comprising a series of stacked seals each having a complementary wedge-shaped cross section. The seals are formed of a compressible but non-resilient material, unlike the hard plastic material of which the present seal is formed. No metal retainer having a conically angled face for urging the seal(s) against the shaft, as provided in the present invention, is provided by Chesterton et al., nor is any low pressure O-ring seal provided between other seals.

U.S. Pat. No. 4,560,176 issued on Dec. 24, 1985 to H. Milton Hoff, titled "Inverted Cone Stuffing Box," describes a seal assembly including a series of conically shaped seal components, each having an axial split along one side to provide for installation on an existing polished rod assembly in an oil well, without requiring disassembly thereof. The Hoff seals more closely resemble the seals of the Moseley '572 and Tschappat '776 U.S. patents, discussed further above, than they do the present seal.

U.S. Pat. No. 4,570,944 issued on Feb. 18, 1986 to Henry A. Traub, titled "Seal Assembly With Reduced Wear Low Pressure Sealing Ring," describes an assembly having a pair of rings with mating conical faces, which in turn bear against a ring of softer, resilient material. The high pressure seal is formed of PTFE, which material is somewhat softer than the material of the present seal, with the low pressure seal being even softer. No intervening seal is provided between the two seals.

U.S. Pat. No. 5,292,137 issued on Mar. 8, 1994 to Brian Simmons et al., titled "Rotary Shaft Sealing Method And Device," describes a pair of embodiments of shaft seal assemblies. Both embodiments include metallic, trapezoidally shaped seals having conical faces which abut mating conical faces of other components of the assembly, in addition to other elastomer or resilient seals. The conically tapered seal of Simmons et al. cannot function in the manner of the tapered seal of the present invention, in that (1) it is formed of a hard metal and cannot deform or "flow" to compensate for wear, and (2) the installation of additional seal material at its base precludes axial movement along the shaft to take up wear, in any event.

European Patent Publication No. 76,169 published on Jun. 4, 1983 to Flexbox Limited, titled "A Mechanical Seal For Rotary Shafts," describes a frusto-spherical mating supplementary seal pair configured to provide a good seal between the mating spherical surfaces even in the event of slight misalignment of the shaft of the apparatus. The two supplementary seals are urged into position by an O-ring which bears against the back of one seal, with the opposite seal being retained within the housing of the assembly. The seal surface is provided between the two seal components, rather than by urging a plastic seal material against the shaft by means of its conical fit within a metal seal holder or housing, as in the present invention. No specific seal material is described in the '169 European Patent Publication.

Japanese Patent Publication No. 2-298,653 published on Dec. 11, 1990 to Riken Corp., titled "Piston For Internal Combustion Engine," describes (according to the drawings and English abstract) various embodiments of a metal oil control ring. The various embodiments all include overlapping end components at their ring gaps, with one embodiment comprising complementary triangular cross sections. However, this cross section only extends for a short distance along the circumference of the ring to each side of the ring gap, and does not extend around the ring to any degree. In contrast, the present hard plastic seal has a continuous, unbroken circumference and a continuous triangular cross section which mates closely with the face of a complementary retainer component.

Finally, PCT Patent Publication No. 91/10,826 published on Jul. 25, 1991 to Laszlo Wilheim, titled "Piston Ring Device For Piston Reciprocating Engines, Mainly For Internal Combustion Engines," describes various embodiments of a discontinuous piston ring formed of conventional rigid metal and having a gap or the like in their circumferences for installing in the ring groove of a piston. One embodiment comprises a pair of trapezoidally shaped components, with their sloped faces mating with one another. The Wilheim rings more closely resemble the piston rings of the Schaub '579 and other U.S. patents, discussed further above, than they do the circumferentially unbroken reciprocating plunger seal of the present invention.

None of the above inventions and patents, taken either singularly or in combination, is seen to describe the instant invention as claimed. Thus a seal for a reciprocating plunger solving the aforementioned problems is desired.

SUMMARY OF THE INVENTION

The present invention is a seal for the reciprocating plunger of a pump or similar device, which provides positive sealing of the high pressure area of the pump between the walls of the plunger and cylinder in which the plunger operates. Such pumps are used in car washes and other operating environments where the delivery of liquid under high pressure is required. Heretofore, industry practice has been to use relatively soft and pliable seal material between the plunger and cylinder walls in such pumps. Springs are used to urge the seal into contact with the plunger surface. While this type of seal works well to conform closely to the plunger surface, it only does so while it is in good condition, and the relatively soft material of which such seals are made, results in rapid wear and requires frequent replacement of the seals.

The present invention provides a solution to the above problem in the form of a reciprocating plunger seal which is formed of a relatively hard plastic material. This material is ideal for such duty, as it resists wear much better than the softer seals of the prior art, with the life of the present seal generally being equal to the life of other pump components.

Yet, the plastic material of which the present seal is formed, allows some limited "creep" or "flow" during operation, which allows the seal to maintain a good seal against the sides of the plunger and accommodate seal wear. Seals formed of harder materials, such as metal, etc., are incapable of conforming as they wear to the contour of the component being sealed. It has been found that a hard polyimide plastic material, such as Vespel (®, Dupont Corp.) works well in the function of the present invention.

The polyimide seal is held in place by a harder metal retainer, with an O-ring interfaced between the polyimide seal and its metal retainer to serve as a low pressure seal. The seal serves to seal higher pressure differentials between the plunger and cylinder wall, with any residual leakage of relatively lower pressure between the seal and its retainer being stopped by the O-ring between the seal and retainer.

The present plunger seal provides numerous advantages over softer seals of the prior art. The considerably longer life of the present seal (on the order of ten times the life of softer seals) has been noted further above. In addition, the hardness of the present seal serves to stabilize the plunger within its cylinder to a much greater degree than provided by softer seals. The additional bearing support provided by the present seal serves to greatly reduce unwanted slight lateral motions of the plunger within its cylinder, thus increasing pumping efficiency and reducing vibration and noise and correspondingly reducing wear within the pump mechanism as a result.

Accordingly, it is a principal object of the invention to provide an improved high pressure seal for a reciprocating plunger mechanism or other similar mechanisms.

It is another object of the invention to form such a seal from a hard polyimide plastic material for greater wear resistance and longer seal life, while still providing a material which can flow slightly during operation to compensate for material wear and provide a good seal throughout the life of the pump.

It is a further object of the invention to provide a conical shape for such a seal, with a mating conical hard metal retainer seat which results in the seal being urged inwardly toward the plunger by means of internal pressures within the mechanism, and thereby providing a good seal at all times.

Still another object of the invention is to provide a low pressure O-ring seal between the high pressure seal and its retainer, to stop flow therebetween.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a high pressure seal for a reciprocating plunger, as used in high pressure pumps and the like in pressure washers, car washes, and the like. The present seal overcomes the problem of frequent overhaul of such pumps due to the need to replace the relatively soft seals conventionally used in such pumps.

Figure 1:
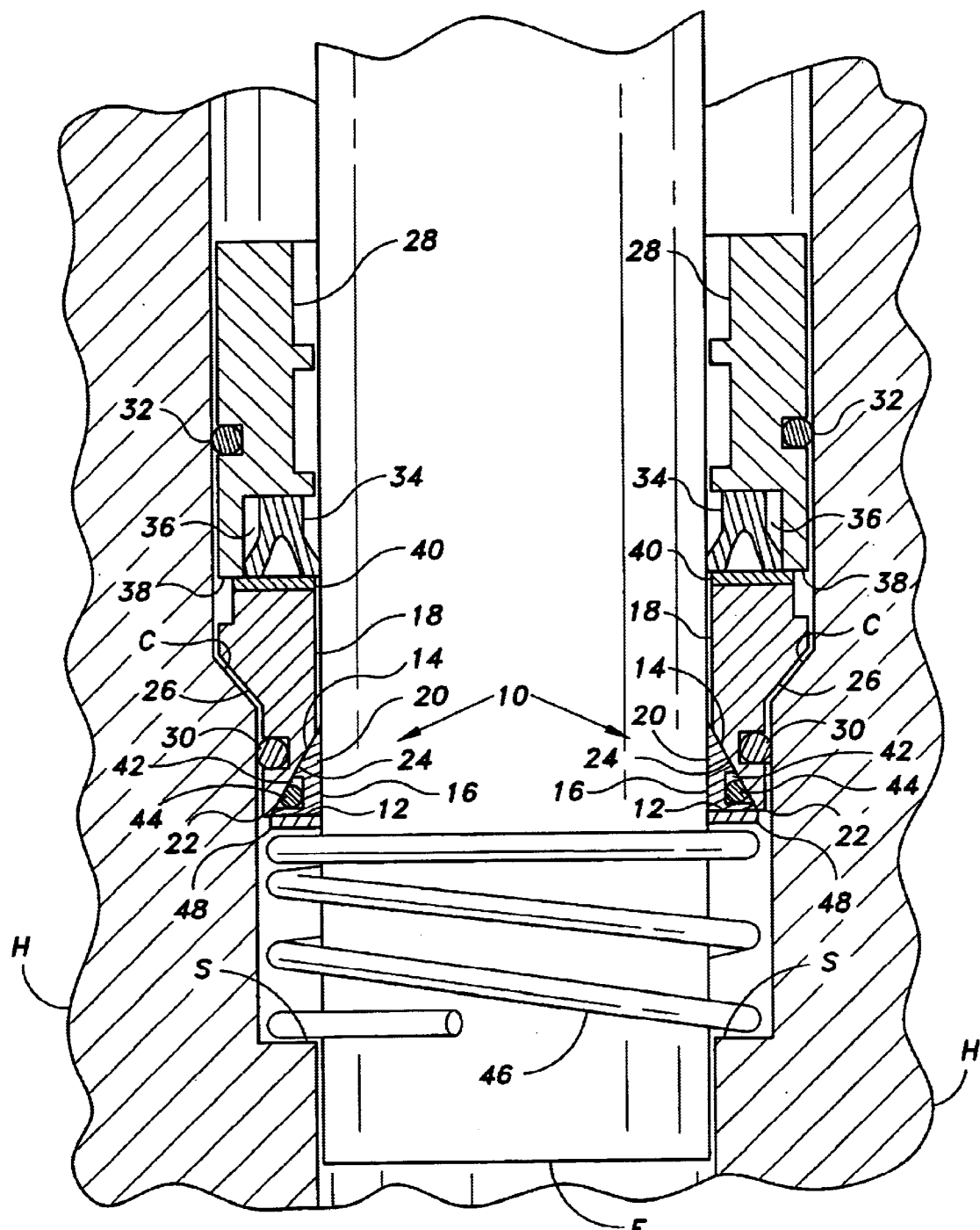
FIG. 1 is an elevation view in section of a seal assembly for a reciprocating plunger, illustrating the present seal, its features, and relationship to other components of the assembly.
Figure 2:
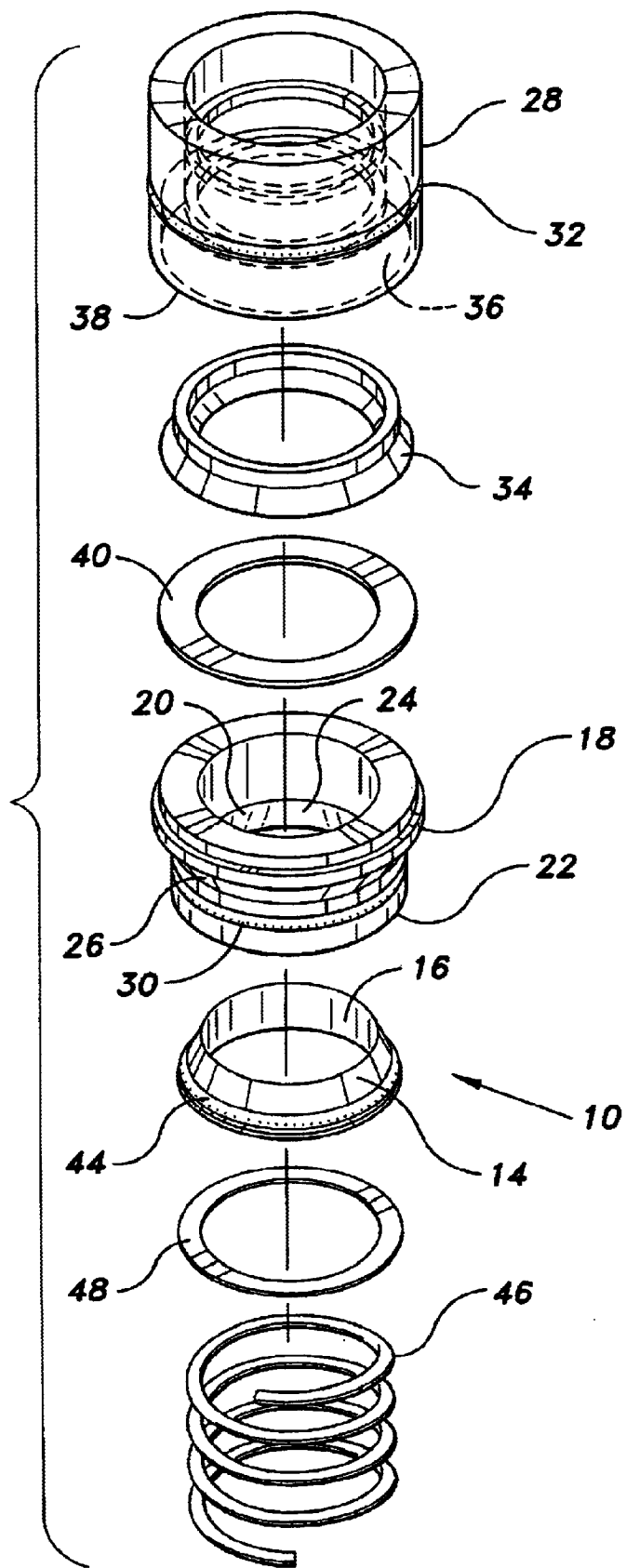
FIG. 2 is an exploded perspective view of the seal assembly, further illustrating details of the present seal and pump seal assembly.

FIG. 1 of the drawings provides an elevation view in section of the present high pressure seal 10 as it would be installed about the plunger of a high pressure pump. The seal 10 generally comprises a toroidal ring (as is clearly shown in FIG. 2) formed of a hard plastic material. Preferably, the plastic is a polyimide material to provide the desired durability, while still allowing some "flow" to conform to the plunger to accommodate wear. An example of such a polyimide material is Vespel®, manufactured by the DuPont Company.

Other polyimides or other types of plastic materials may be used in lieu of the preferred Vespel® material, e.g., Torlon®, etc., but Vespel® is preferred due primarily to its extremely high pressure-velocity rating and its extremely wide temperature range. The suitability of a material as a bearing or seal, may be determined by considering the product of the operating pressure on such a bearing material, and the velocity of the component moving in the bearing. The preferred Vespel® material has a pressure-velocity (P-V) rating of 300,000. In contrast, a plain sleeve bearing formed of relatively durable SAE 660 bronze has a P-V rating of only 75,000, with softer alloys having even lower P-V ratings on the order of 50,000. The extremely high P-V rating of the preferred polyimide material provides excellent wear resistance, yet the plastic allows the material to "flow" and "creep" to a limited extent to maintain close tolerances with the plunger as the seal 10 wears.

The high pressure seal 10 forms a circumferentially unbroken, continuous ring, and has a generally triangular cross section in a plane through its diameter. The cross-sectional shape of the present seal 10 is defined by a flat, radially disposed (i.e., across the diameter of the seal 10) pressure surface 12, an inwardly tapering, conical retainer bearing surface 14, and an internal cylindrical plunger sealing surface 16. The pressure surface 12 is oriented toward the working, high pressure fluid end E of the plunger, with the conical retainer bearing surface 14 tapering inwardly away from the pressure surface 12 of the seal 10.

The present seal assembly also includes a high pressure seal retainer 18, which mates closely with the conical retainer bearing surface 14 of the high pressure seal 10. The high pressure seal retainer 18 is formed of a hard metal material and has a toroidal seal retaining receptacle 20 therein, with the seal receptacle 20 having a triangular cross section and closely conforming to the triangular cross sectional shape of the seal 10. The seal receptacle 20 is defined by the outer edge or corner 22 of the high pressure seal retainer 18, from which a conical seal bearing surface 24 extends away from the pressure surface 12 of the seal 10 and inwardly toward the surface of the plunger, and by the surface of the plunger. The conical seal bearing surface 24 of the seal retainer 18 is configured to mate closely with the retainer bearing surface 14 of the seal 10, to allow minimal leakage therebetween.

The high pressure seal retainer 18 is prevented from movement toward the high pressure or working end E of the plunger P, by an inwardly tapering conical portion C of the housing H of the assembly and a mating, outwardly tapering conical shoulder 26 extending from the retainer 18. The high pressure seal retainer 18 is in turn secured within the housing H of the assembly by a low pressure retainer 28 which is secured conventionally within the housing H of the assembly, e.g., mating internally threaded housing bore and externally threaded low pressure retainer body, retaining rings and corresponding grooves, etc. Conventional O-rings 30 and 32 are provided between the external surfaces of the high and low pressure retainers 18 and 26, and internal wall of the housing H.

Additional low pressure sealing is provided between the metal high pressure retainer 18 and low pressure retainer 28, by a toroidal "cup" seal 34 (i.e., a seal having a U- or cup-shaped cross section), which is installed within an annular retaining groove 36 within the high pressure retainer mating end 38 of the low pressure retainer 28. A metal retaining ring 40 is placed between the high and low pressure retainers 18 and 28, to hold the cup seal 34 in place.

In addition to the above described low pressure sealing means, a circumferential O-ring groove 42 is formed in the conical retainer bearing surface 14 of the high pressure seal 10. An O-ring 44 is installed therein, surrounding the seal 10 and providing a continuous and self adjusting low pressure, stationary seal between the two conical faces 14 and 24 respectively of the high pressure seal 10 and its retainer 18.

It will be seen that the inward conical taper of the high pressure seal receptacle 20, causes the high pressure seal 10 to be forced inwardly against the surface of the plunger as working fluid pressure is applied to the high pressure side or surface 12 of the seal 10. Some slight wear of the plunger sealing surface 16 of the seal 10 occurs during operation of the mechanism. However, the present high pressure seal 10 automatically adjusts for this wear, with the plastic material of the seal 10 progressively "flowing" into the conically tapered seal receptacle 20 of the retainer 18, with the taper wedging the seal 10 progressively against the surface of the plunger.

As the high pressure seal 10 wears, there is some slight relative movement of the tapered seal face 14 relative to the mating face 24 of the seal retainer 18. This is accommodated by the stationary O-ring seal 44 between the high pressure seal 10 and its retainer 18. The mating faces 14 and 24 of the seal 10 and its retainer 18 serve to provide the vast majority of sealing required to prevent the passage of high pressure fluid past the seal 10. However, the seal O-ring 44 serves to complete the sealing duty, by sealing any residual fluid leakage which is under relatively low pressure at that point. All of the O-rings 30, 32, and 44 serve as stationary seals, with the slight "creep" or "flow" of the hard plastic high pressure seal 10 resulting in minuscule movement of the seal and retainer interfaces 14 and 24 over time, and the O-ring seal 44 being stationary, for all practical purposes of an O-ring seal.

The reciprocating plunger mechanism for which the present seal assembly is provided, produces alternating cyclic high and low pressure loads as fluid is drawn into the working chamber of the device under relatively low pressure, and then forced from the device by the plunger under extremely high pressure. It will be seen that while the low pressure seal retainer 18 is held in place by the conical face C of the housing H and mating conical shoulder 26 of the retainer 18, the high pressure seal 10 requires some form of retaining means to assure that it remains within the conical seal retaining receptacle 20 of the high pressure seal retainer 18 and is not withdrawn by the low pressure portion of the cycle.

Accordingly, a coil spring 46 is installed concentrically surrounding the plunger, disposed between a shoulder S in the plunger cylinder of the housing H and the high pressure surface or side 12 of the high pressure seal 10. A toroidal bearing plate or ring 48 is installed atop the high pressure side or surface 12 of the seal 10, to protect the seal 10 from the relatively harder metal of the spring 46. The compression of the spring 46 provides a continuous compressive force bearing against the bearing plate 48 and thus against the pressure face 12 of the seal 10, urging the seal 10 inwardly into the conical seal retaining receptacle 20 of the high pressure seal retainer 18, regardless of the relative pressure or suction developed by the plunger within its cylindrical bore in the housing H.

In conclusion, the present high pressure seal assembly provides numerous benefits and advantages over the conventional, relatively soft elastomer seals of the prior art. The present seal provides much greater lateral support to the plunger within the pump mechanism, due to the radially inward pressure of the conical seat in which the seal is installed. The relatively hard plastic material of which the present seal is formed greatly inhibits lateral motion of the plunger within its cylinder bore, thereby greatly reducing vibration, noise, and excessive wear of the plunger and cylinder. The seal itself wears only very gradually due to the hardness of the material, and as it wears, it is forced inwardly into its conical receptacle seat and wedged securely against the plunger at all times to support the plunger.

Yet, as the seal material is a plastic, it does possess some properties of "flow" and "creep" under pressure. This allows the seal to conform closely to the surface of the plunger as it wears, essentially providing a self-adjusting fit for the seal about the plunger and within the seal retainer. The result of the present seal assembly invention is to extend the seal life of such high pressure pump mechanisms by a factor of ten or so in comparison to earlier developed elastomer seals, with the present seal having a lifetime of about the same as that of the remainder of the pump mechanism. This allows owners and operators of such pumps to forgo the prior periodic tear down and overhaul of such pumps to replace their seals, thus saving owners and operators of pumps equipped with the present seal, a considerable amount of down time and maintenance costs for such devices.

It is to be understood that the present invention is not limited to the embodiment described above, but encompasses any and all embodiments within the scope of the following claims.

I claim:

1. A seal assembly for a reciprocating plunger, comprising:

a toroidal high pressure seal formed of a hard polyimide, circumferentially unbroken, continuous ring of plastic material;

said high pressure seal having a generally triangular cross section defined by a flat, radially disposed pressure surface, a conical retainer bearing surface tapering inwardly and away from said pressure surface, and an internal cylindrical plunger sealing surface, and a circumferential O-ring groove formed in said conical retainer bearing surface of said high pressure seal; and an O-ring disposed within said O-ring groove of said high pressure seal and bearing against said conical seal bearing surface of said high pressure seal retainer;

a high pressure seal retainer formed of a hard metal material and having a toroidal seal retaining receptacle therein;

said high pressure seal retainer further including a conical seal bearing surface tapering inwardly and away from said pressure surface of said high pressure seal, and mating closely therewith; whereby said high pressure seal is forced further into said seal retaining receptacle of said high pressure seal retainer as pressure is applied to said pressure surface of said high pressure seal, with said inward taper of said conical seal bearing surface urging said high pressure seal more closely against the plunger.

2. The seal assembly according to claim 1, wherein said high pressure seal is formed of a material having a pressure—velocity rating of about 300,000.

3. The seal assembly according to claim 1, wherein said O-ring providing a low pressure seal between said high pressure seal and said high pressure seal retainer.

4. The seal assembly according to claim 1, further including a coil spring surrounding the plunger and bearing against said pressure surface of said high pressure seal, for retaining said high pressure seal within said seal retaining receptacle of said high pressure seal retainer under conditions of very low pressure.

5. The seal assembly according to claim 1, further including a low pressure seal retainer securing said high pressure seal retainer in place.

6. A seal assembly for a reciprocating plunger, comprising:

a toroidal high pressure seal formed as a circumferentially unbroken, continuous ring having a generally triangular cross section defined by a flat, radially disposed pressure surface, a conical retainer bearing surface tapering inwardly and away from said pressure surface, and an internal cylindrical plunger sealing surface;

a high pressure seal retainer having a toroidal seal retaining receptacle therein;

said high pressure seal retainer further including a conical seal bearing surface tapering inwardly and away from said pressure surface of said high pressure seal, and mating closely therewith;

a circumferential O-ring groove formed in said conical retainer bearing surface of said high pressure seal;

an O-ring disposed within said O-ring groove of said high pressure seal and bearing against said conical seal bearing surface of said high pressure seal retainer; whereby said high pressure seal is forced further into said seal retaining receptacle of said high pressure seal retainer as pressure is applied to said pressure surface of said high pressure seal, with said inward taper of said conical seal bearing surface urging said high pressure seal more closely against the plunger, and said O-ring further providing a low pressure seal between said high pressure seal and said high pressure seal retainer.

7. The seal assembly according to claim 6, wherein said high pressure seal is formed of a hard polyimide plastic material.

8. The seal assembly according to claim 6, wherein said high pressure seal retainer is formed of a hard metal material.

9. The seal assembly according to claim 6, wherein said high pressure seal is formed of a material having a pressure—velocity rating of about 300,000.

10. The seal assembly according to claim 6, further including a coil spring surrounding the plunger and bearing against said pressure surface of said high pressure seal, for retaining said high pressure seal within said seal retaining receptacle of said high pressure seal retainer under conditions of very low pressure.

11. The seal assembly according to claim 6, further including a low pressure seal retainer securing said high pressure seal retainer in place.

12. A seal assembly for a reciprocating plunger, comprising:

a toroidal high pressure seal formed as a circumferentially unbroken, continuous ring having a generally triangular cross section defined by a flat, radially disposed pressure surface, a conical retainer bearing surface tapering inwardly and away from said pressure surface, and an internal cylindrical plunger sealing surface, and a circumferential O-ring groove formed in said conical retainer bearing surface of said high pressure seal;

an O-ring disposed Within said O-ring groove of said high pressure seal;

a high pressure seal retainer having a toroidal seal retaining receptacle therein;

said high pressure seal retainer further including a conical seal bearing surface tapering inwardly and away from said pressure surface of said high pressure seal, and mating closely therewith; and a coil spring surrounding the plunger and bearing against said pressure surface of said high pressure seal; whereby said high pressure seal is forced further into said seal retaining receptacle of said high pressure seal retainer as pressure is applied to said pressure surface of said high pressure seal, with said inward taper of said conical seal bearing surface urging said high pressure seal more closely against the plunger, and said spring retaining said high pressure seal within said seal retaining receptacle of said high pressure seal retainer under conditions of very low pressure.

13. The seal assembly according to claim 12, wherein said high pressure seal is formed of a hard polyimide plastic material.

14. The seal assembly according to claim 12, wherein said high pressure seal retainer is formed of a hard metal material.

15. The seal assembly according to claim 12, wherein said high pressure seal is formed of a material having a pressure—velocity rating of about 300,000.

16. The seal assembly according to claim 12, wherein said O-ring bears against said conical seal bearing surface of said high pressure seal retainer, for providing a low pressure seal between said high pressure seal and said high pressure seal retainer.

17. The seal assembly according to claim 12, further including a low pressure seal retainer securing said high pressure seal retainer in place.

* * * * *